(12) United States Patent
Fujiwara et al.

(10) Patent No.: US 7,115,162 B2
(45) Date of Patent: *Oct. 3, 2006

(54) AQUEOUS INK, INKJET RECORDING INK AND INKJET RECORDING METHOD

(75) Inventors: Toshiki Fujiwara, Kanagawa (JP); Yoshiharu Yabuki, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/010,309

(22) Filed: Dec. 14, 2004

(65) Prior Publication Data

US 2005/0139121 A1 Jun. 30, 2005

(30) Foreign Application Priority Data

Dec. 26, 2003 (JP) .............................. 2003-434594

(51) Int. Cl.
*C09D 11/00* (2006.01)
*C09D 11/02* (2006.01)

(52) U.S. Cl. ................................. 106/31.5; 106/31.52

(58) Field of Classification Search ............. 106/31.52, 106/31.5; 427/466
See application file for complete search history.

(56) References Cited

U.S. PATENT DOCUMENTS 4,908,435 A * 3/1990 Gregory .................... 534/761
2004/0154496 A1    8/2004 Taguchi
2004/0187232 A1 *  9/2004 Chino et al. .................. 8/639
2005/0061201 A1 *  3/2005 Takasaki et al. ......... 106/31.52
2005/0139123 A1 *  6/2005 Fujiwara .................. 106/31.48
2005/0150420 A1 *  7/2005 Takasaki et al. ........... 106/31.5
2005/0243151 A1 * 11/2005 Chino et al. ................ 347/100

FOREIGN PATENT DOCUMENTS

EP          1420051      *  5/2004
WO     WO 03/087238 A1  * 10/2003

* cited by examiner

*Primary Examiner*—Helene Klemanski
(74) *Attorney, Agent, or Firm*—Buchanan Ingersoll & Rooney PC

(57) ABSTRACT

To provide an aqueous ink, particularly, an inkjet recording ink, and an inkjet recording method, which can form an image having good color hue and excellent fastness to light and active gases in the environment, particularly, ozone gas, the aqueous ink has a polyazo dye containing at least two azo groups, an ionic hydrophilic group, and a sulfur-containing 5-membered heterocyclic group; and an inkjet recording ink and an inkjet recording method each using the aqueous ink.

4 Claims, No Drawings

AQUEOUS INK, INKJET RECORDING INK AND INKJET RECORDING METHOD

BACKGROUND OF THE INVENTION

1. Field of the Invention

The present invention related to an aqueous ink comprising at least one disazo or polyazo dye, and also relates to an inkjet recording ink and an inkjet recording method.

2. Background Art

The coloring agent used in an inkjet recording ink is required to have high solubility or dispersibility in a solvent, enable high-density recording, provide good color hue, be resistant to light, heat and active gases in the environment (for example, oxidative gases such as NOx and ozone, and SOx), exhibit excellent fastness to water and chemicals, ensure good fixing property to an image-receiving material and less bleeding, give an ink having excellent storability, have high purity and no toxicity, and be available at a low cost. However, it is very difficult to find out a coloring agent satisfying these requirements in a high level. In particular, a black dye providing good color hue for compensating a color corresponding to a longer wavelength side in a black color, exhibiting fastness to light, humidity and heat, and exhibiting fastness to oxidative gases in the environment such as ozone when the image is printed on an image-receiving material having an ink-receiving layer containing a porous inorganic white pigment particle, are strongly demanded.

Azo coloring matters comprising a sulfur-containing heterocyclic coupler as a coupling component of an azo dye have been heretofore disclosed, for example, in JP-A-54-46226 (the term "JP-A" as used herein means an "unexamined published Japanese patent application"), JP-A-54-139638, JP-A-60-235866, JP-A-2001-207092, JP-A-59-152957, JP-A-6-143838 and JP-A-6-143839. However, azo dyes described in these publications all are insufficient in the fastness to light, heat, humidity, active gases in the environmental and the like.

SUMMARY OF THE INVENTION

The present invention has been made to solve those problems in conventional techniques and achieve the following objects.

That is, an object of the present invention is to provide an aqueous ink for printing such as inkjet printing or for writing, which has good color hue and gives a colored image or colored material having excellent fastness.

Another object of the present invention is to provide an inkjet recording ink and an inkjet recording method, which can form an image having good color hue and high fastness to light and active gases in the environment, particularly, ozone gas.

As a result of extensive studies on various dye compound derivatives with an attempt to find a dye having good color hue and high fastness to light and ozone, the present inventors have found that those problems can be overcome by an azo dye mainly using a heterocyclic ring as the raw material.

More specifically, according to the present invention, an aqueous ink, an inkjet recording ink and an inkjet recording method having the following constitutions are provided, whereby the above-described objects of the present invention can be achieved.

1. An aqueous ink comprising a polyazo dye, wherein the polyazo dye comprises:
   at least two azo groups;
   an ionic hydrophilic group; and
   a sulfur-containing 5-membered heterocyclic group.
2. The aqueous ink as described in 1, wherein the at least two azo groups each independently has the sulfur-containing 5-membered heterocyclic group.
3. The aqueous ink as described in 1, wherein the polyazo dye is represented by formula (1):

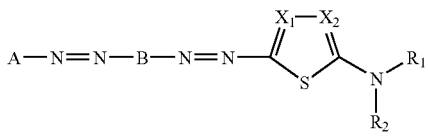

wherein

A and B each independently represents an aromatic group which may be substituted, or a heterocyclic group which may be substituted;

$X_1$ and $X_2$ each independently represents a nitrogen atom, $=CR_3-$ or $-CR_4=$;

$R_1$ and $R_2$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent; and $R_3$ and $R_4$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an alkylamino group, an arylamino group, a heterocyclic amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted.

4. The aqueous ink as described in 3, wherein B represents the heterocyclic group comprising the sulfur-containing 5-membered heterocyclic group.
5. The aqueous ink as described in any one of 1 to 4, which is for inkjet recording.
6. An inkjet recording method comprising forming an image on an image-receiving material by using an aqueous ink described in any one of 1 to 4, the image-receiving material comprises: a support; and an image-receiving layer comprising an inorganic white pigment particle.
7. The polyazo dye represented by formula (1) described in 3.
8. A coloring composition for image formation, comprising at least one polyazo dye described in 7.
9. A heat-sensitive recording material, a color toner and a color filter each comprising at least one polyazo dye described in 7.

The novel azo dye of the present invention (hereinafter sometimes referred to as a "dye of the present invention")

uses, as a black coloring matter, a novel coloring matter having absorption characteristics excellent in the color reproducibility and having sufficiently high fastness to light, heat, humidity and active gases in the environment, so that a colored image or colored material excellent in the color hue and fastness can be obtained. In particular, the dye of the present invention is preferably used for the preparation of, for example, an ink for printing such as inkjet printing, an ink sheet for heat-sensitive recording materials, a color toner for electrophotographic process, a color filter for use in displays such as LCD and PDP or in imaging devices such as CD, and a dying solution for dyeing various fibers.

The inkjet recording ink and inkjet recording method using the coloring composition of the present invention can form an image having good color hue and high fastness to light and active gases in the environment, particularly ozone gas.

The color toner formed from the coloring composition of the present invention exhibits excellent fastness to light, faithful color reproduction and high OHP quality.

DETAILED DESCRIPTION OF THE INVENTION (Azo Dye)

The azo dye represented by formula (1) for use in the present invention (hereinafter sometimes referred to as a "dye of the present invention") is described in detail below.

In formula (1), A and B each independently represents an aromatic group which may be substituted, or a heterocyclic group which may be substituted. Examples of the aromatic ring include a benzene ring and a naphthalene ring, and these rings each may be substituted by any substituent. Examples of the substituent which can be substituted include those of the substituent represented by $R_1$ described later.

Examples of the heteroatom in the heterocyclic ring include N, O and S. The heterocyclic ring may be condensed with an aliphatic ring, an aromatic ring or another heterocyclic ring.

A is preferably a benzene ring which may be substituted, or a naphthalene ring which may be substituted. B is preferably a benzene ring which may be substituted, a naphthalene ring which may be substituted, or a heterocyclic ring shown below.

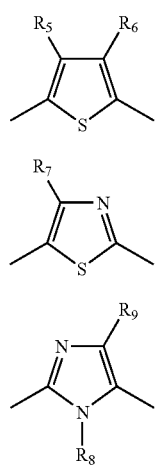

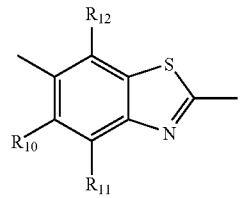

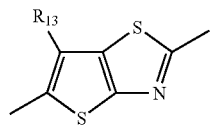

In formulae (a) to (e), $R_5$ to $R_{13}$ each represents the same substituent as the substituent $R_1$ described later.

Among formulae (a) to (e), preferred are a thiophene ring, a thiazole ring, an imidazole ring and a thieno-thiazole ring represented by formulae (a), (b), (c) and (e).

B is more preferably the heterocyclic group. In particular, a sulfur-containing 5-membered heterocyclic group such as formulae (a), (b), (d) and (e) is preferred, and a sulfur-containing 5-membered heterocyclic group represented by formula (a), (b) or (e) is more preferred.

$R_3$ and $R_4$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkyl group-substituted amino group, an aryl group-substituted amino group, a heterocyclic group-substituted amino group, an acylamino group, an ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, a heterocyclic thio group, an alkylsulfonyl group, an arylsulfonyl group, an alkylsulfinyl group, an arylsulfinyl group, a sulfamoyl group or a sulfo group, and each group may be further substituted.

Examples of the aromatic ring represented by A include a benzene ring and a naphthalene ring, and these rings each may be substituted by any substituent. The substituent which may be substituted is preferably an electron-withdrawing group. Specifically, an electron-withdrawing group having a Hammett's σp value of 0.2 or more is preferred.

Here, the Hammett's substituent constant σp value is described.

The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96–103, Nankodo (1979). In the present invention, each substituent is limited or described by using the Hammett's substituent constant σp but this does not mean that the substituent is limited only to those having a known value which can be found in the above-described publications. Needless to say, the substituent includes substituents of which σp value is not known in publications but when measured based on the Hammett's rule, falls within the range specified. Furthermore, although formula (1) of the present invention includes those which are not a benzene derivative, the σp value is used as a measure for showing the electron effect of substituent irrespective of the substitution site. In the present invention, the σp value is used in this meaning.

Examples of the electron-withdrawing group having a Hammett's substituent constant σp value of 0.60 or more include a cyano group, a nitro group, an alkylsulfonyl group (e.g., methanesulfonyl) and an arylsulfonyl group (e.g., benzenesulfonyl).

Examples of the electron-withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a σp value of 0.20 or more include, in addition to those described above, a halogen atom.

Preferred examples of the substituents represented by $R_3$ and $R_4$ include a hydrogen atom, a halogen atom, a cyano group, an aliphatic group, an aromatic group, a hydroxy group, an alkoxy group, an aryloxy group, an acyloxy group, a heterocyclic oxy group, an alkyl group-substituted amino group, an aryl group-substituted amino group, a heterocyclic group-substituted amino group, an acylamino group, an ureido group, a sulfamoylamino group, an alkoxycarbonylamino group, an alkyl thio group, an arylthio group and a heterocyclic thio group. Among these, more preferred are a hydrogen atom, a halogen atom, a cyano group, an aliphatic group, an aromatic group, a hydroxy group and an alkoxy group.

$R_1$ and $R_2$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent.

Preferred examples of the substituents represented by $R_1$ and $R_2$ include a hydrogen atom, an aliphatic group, an aromatic group, a heterocyclic group, an acyl group, an alkylsulfonyl group and an arylsulfonyl group.

When the substituents represented by $R_1$, $R_2$, $R_3$ and $R_4$ each has a substituent, examples of the substituent include those described above for the substituents represented by $R_3$ and $R_4$.

In the case where the azo dye represented by formula (1) is a water-soluble dye, the dye preferably has two or more ionic hydrophilic groups as substituents at any position on A, B, $R_1$, $R_2$, $R_3$ and $R_4$. Examples of the ionic hydrophilic group as the substituent include a sulfo group, a phosphono group, a carboxyl group and a quaternary ammonium group. This ionic hydrophilic group is preferably a carboxyl group or a sulfo group, more preferably a sulfo group. The carboxyl group, phosphono group and sulfo group each may be in a salt state and examples of the counter ion for forming the salt include ammonium ion, alkali metal ions (e.g., lithium ion, sodium ion, potassium ion) and organic cations (e.g., tetramethylguanidium ion, tetramethylammonium ion).

The substituents represented by $R_1$, $R_2$, $R_3$ and $R_4$ are described in detail below.

Examples of the halogen atom include a fluorine atom, a chlorine atom and a bromine atom.

In the present invention, the aliphatic group means an alkyl group, a substituted alkyl group (including an aralkyl group and a substituted aralkyl group), an alkenyl group, a substituted alkenyl group, an alkynyl group or a substituted alkynyl group. The aliphatic group may be branched or may form a ring. The number of carbon atoms in the aliphatic group is preferably from 1 to 20, more preferably from 1 to 16. The aryl moiety in the aralkyl group or substituted aralkyl group is preferably phenyl or naphthyl, more preferably phenyl. Examples of the aliphatic group include methyl, ethyl, butyl, isopropyl, tert-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl.

In the present invention, the aromatic group means an aryl group or a substituted aryl group. The aryl group is preferably phenyl or naphthyl, more preferably phenyl. The number of carbon atoms in the aromatic group is preferably from 6 to 20, more preferably from 6 to 16.

Examples of the aromatic group include phenyl, p-tolyl, p-methoxyphenyl, o-chlorophenyl and m-(3-sulfo-propylamino)phenyl.

The heterocyclic group includes a heterocyclic group having a substituent, and an unsubstituted heterocyclic group. The heterocyclic ring may be condensed with an aliphatic ring, an aromatic ring or another heterocyclic ring. The heterocyclic group is preferably a 5- or 6-membered heterocyclic group. Examples of the substituent include an aliphatic group, a halogen atom, an alkyl sulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a carbamoyl group having a substituent, and an unsubstituted carbamoyl group. Examples of the substituent include an alkyl group. Examples of the carbamoyl group include a methylcarbamoyl group and a dimethylcarbamoyl group.

The alkoxycarbonyl group includes an alkoxycarbonyl group having a substituent, and an unsubstituted alkoxycarbonyl group. The alkoxycarbonyl group is preferably an alkoxycarbonyl group having from 2 to 12 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituent, and an unsubstituted aryloxycarbonyl group. The aryloxycarbonyl group is preferably an aryloxycarbonyl group having from 7 to 12 carbon atoms. Examples of the substituent include an ionic hydrophilic group. Examples of the aryloxycarbonyl group include a phenoxycarbonyl group.

The acyl group includes an acyl group having a substituent, and an unsubstituted acyl group. The acyl group is preferably an acyl group having from 1 to 12 carbon atoms. Examples of the substituent include an ionic hydrophilic group. Examples of the acyl group include an acetyl group and a benzoyl group.

The alkoxy group includes an alkoxy group having a substituent, and an unsubstituted alkoxy group. The alkoxy group is preferably an alkoxy group having from 1 to 12 carbon atoms. Examples of the substituent include an alkoxy group, a hydroxyl group and an ionic hydrophilic group. Examples of the alkoxy group include a methoxy group, an ethoxy group, an isopropoxy group, a methoxy-ethoxy group, a hydroxyethoxy group and a 3-carboxypropoxy group.

The aryloxy group includes an aryloxy group having a substituent, and an unsubstituted aryloxy group. The aryloxy group is preferably an aryloxy group having from 6 to 12 carbon atoms. Examples of the substituent include an alkoxy group and an ionic hydrophilic group. Examples of the aryloxy group include a phenoxy group, a p-methoxyphenoxy group and an o-methoxyphenoxy group.

The acyloxy group includes an acyloxy group having a substituent, and an unsubstituted acyloxy group. The acyloxy group is preferably an acyloxy group having from 1 to 12 carbon atoms. Examples of the substituent include an ionic hydrophilic group. Examples of the acyloxy group include an acetoxy group and a benzoyloxy group.

The carbamoyloxy group includes a carbamoyloxy group having a substituent, and an unsubstituted carbamoyloxy group. Examples of the substituent include an alkyl group. Examples of the carbamoyloxy group include an N-methylcarbamoyloxy group.

The heterocyclic oxy group includes a heterocyclic oxy group having a substituent, and an unsubstituted heterocyclic oxy group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include trimethylsilyloxy and diphenylmethylsilyloxy.

The alkoxycarbonyloxy group includes an alkoxycarbonyloxy group having a substituent, and an unsubstituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes an aryloxycarbonyloxy group having a substituent, and an unsubstituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The substituent of the amino group substituted by an alkyl group, an aryl group or a heterocyclic group may further have a substituent. An unsubstituted amino group is not included. The alkylamino group is preferably an alkylamino group having from 1 to 6 carbon atoms. Examples of the substituent include an ionic hydrophilic group. Examples of the alkylamino group include a methylamino group and a diethylamino group. The arylamino group includes an arylamino group having a substituent, and an unsubstituted arylamino group. The arylamino group is preferably an arylamino group having from 6 to 12 carbon atoms. Examples of the substituent include a halogen atom and an ionic hydrophilic group. Examples of the arylamino group include an anilino group and a 2-chloroanilino group.

The acylamino group includes an acylamino group having a substituent. The acylamino group is preferably an acylamino group having from 2 to 12 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes an ureido group having a substituent and an unsubstituted ureido group. The ureido group is preferably an ureido group having from 1 to 12 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent, and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent, and an unsubstituted alkoxycarbonylamino group. The alkoxycarbonylamino group is preferably an alkoxycarbonylamino group having from 2 to 12 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent, and an unsubstituted aryloxycarbonylamino group. The aryloxycarbonylamino group is preferably an aryloxycarbonylamino group having from 7 to 12 carbon atoms. Examples of the substituent include an ionic hydrophilic group. Examples of the aryloxycarbonylamino group include a phenoxycarbonylamino group.

The alkylsulfonylamino group and the arylsulfonylamino group include an alkylsulfonylamino group having a substituent, an arylsulfonylamino group having a substituent, an unsubstituted alkylsulfonylamino group and an unsubstituted arylsulfonylamino group. The sulfonylamino group is preferably a sulfonylamino group having from 1 to 12 carbon atoms. Examples of the substituent include an ionic hydrophilic group. Examples of these sulfonylamino groups include a methanesufonylamino group, an N-phenylmethanesulfonylamino group, a benzenesulfonylamino group and a 3-carboxybenzenesulfonylamino group.

The alkylthio group, the arylthio group and the heterocyclic thio group include an alkylthio group having a substituent, an arylthio group having a substituent, a heterocyclic thio group having a substituent, an unsubstituted alkylthio group, an unsubstituted arylthio group and an unsubstituted heterocyclic thio group. The alkylthio group, the arylthio group and the heterocyclic thio group are preferably an alkylthio group having from 1 to 12 carbon atoms, an arylthio group having from 1 to 12 carbon atoms and a heterocyclic thio group having from 1 to 12 carbon atoms.

Examples of the substituent include an ionic hydrophilic group. Examples of the alkylthio group, arylthio group and heterocyclic thio group include a methylthio group, a phenylthio group and a 2-pyridylthio group.

Examples of the alkylsulfonyl group and arylsulfonyl group include a methanesulfonyl group and a phenylsulfonyl group.

Examples of the alkylsulfinyl group and arylsulfinyl group include a methanesulfinyl group and a phenylsulfinyl group.

The sulfamoyl group includes a sulfamoyl group having a substituent, and an unsubstituted sulfamoyl group. Examples of the substituent include an alkyl group. Examples of the sulfamoyl group include a dimethylsulfamoyl group and a di-(2-hydroxyethyl)sulfamoyl group.

As for the preferred combination of substituents in the compound represented by formula (1), a compound where $X_1$ is $=CR_3-$, $X_2$ is $-CR_4=$ and $R_4$ is a hydrogen atom, a CN group, an ester group, a carboxyl group or a carbamoyl group, or a compound where $X_1$ is $=CR_3-$ and $X_2$ is a nitrogen atom is preferred.

Specific examples of the azo dye represented by formula (1) are set forth below, but the azo dye for use in the present invention is not limited thereto. As an ionic hydrophilic group, the carboxyl group, phosphono group and sulfo group each may be in a salt state, and examples of the counter ion for forming the salt include ammonium ion, alkali metal ion (e.g., lithium ion, sodium ion, potassium ion) and organic cation (e.g., tetramethylammonium ion, tetramethylguanidium ion, tetramethylphosphonium).

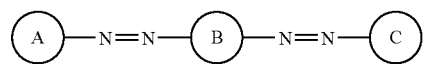

| | A | B | C |
|---|---|---|---|
| 1-1 | 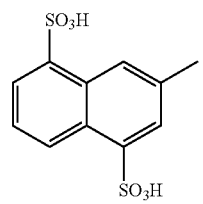 | 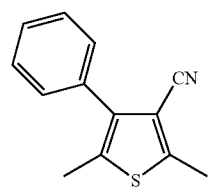 | 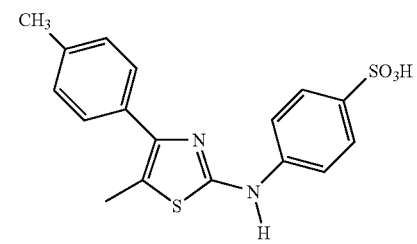 |
| 1-2 | 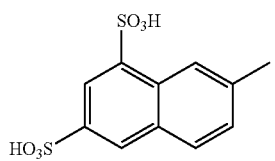 | 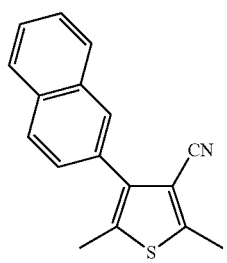 | 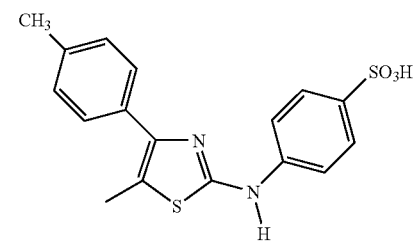 |
| 1-3 | 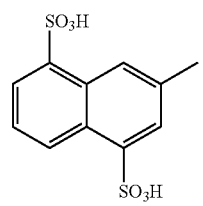 | 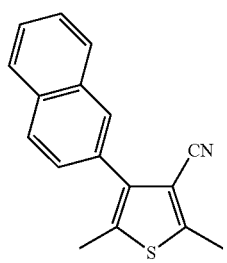 | 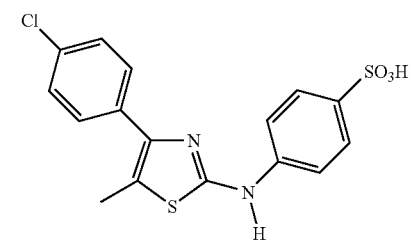 |
| 1-4 | 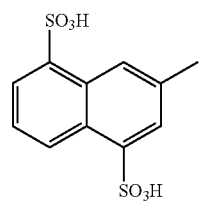 | 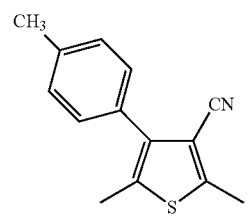 | 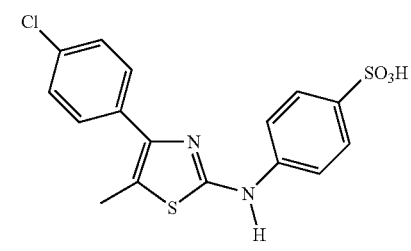 |

-continued
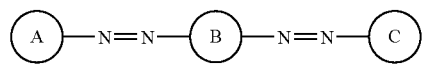
| | A | B | C |
|---|---|---|---|
| 1-5 | 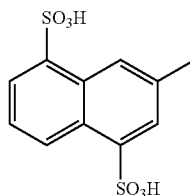 | 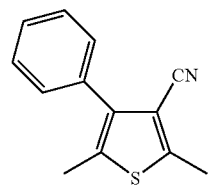 | 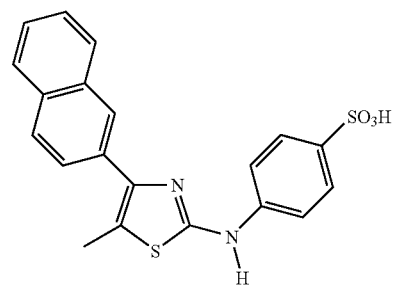 |
| 2-1 | 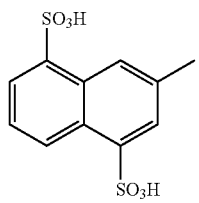 | 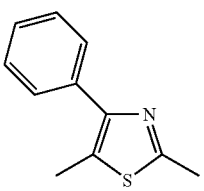 | 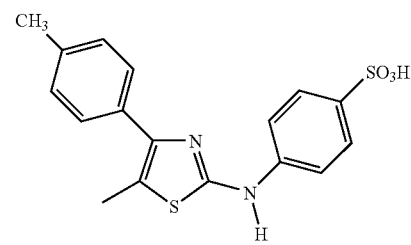 |
| 2-2 | 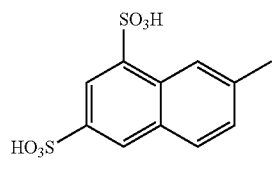 | 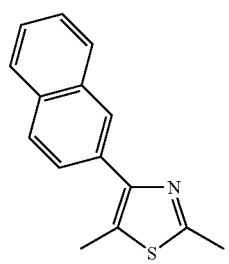 | 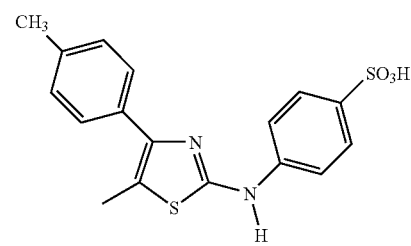 |
| 2-3 | 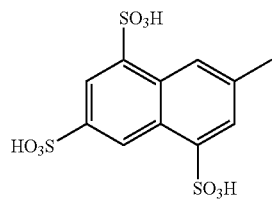 | 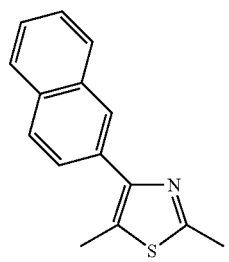 | 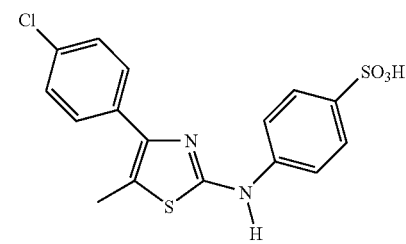 |
| 2-4 | 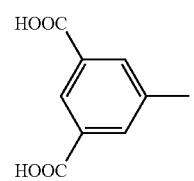 | 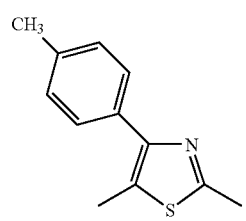 | 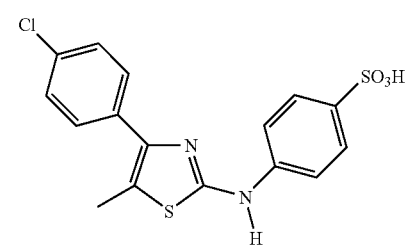 |

-continued
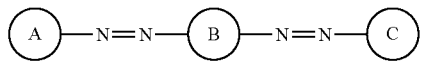
| | A | B | C |
|---|---|---|---|
| 2-5 | 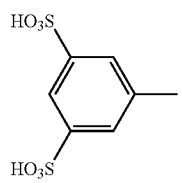 | 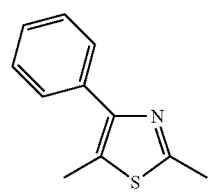 | 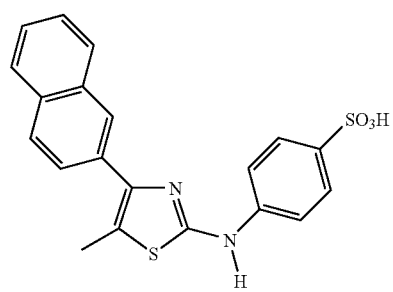 |
| 3-1 | 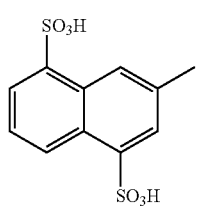 | 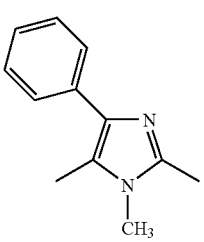 | 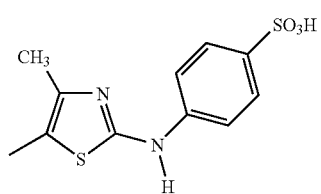 |
| 3-2 | 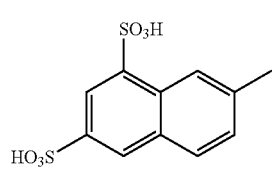 | 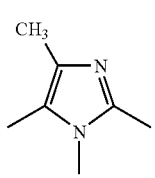 | 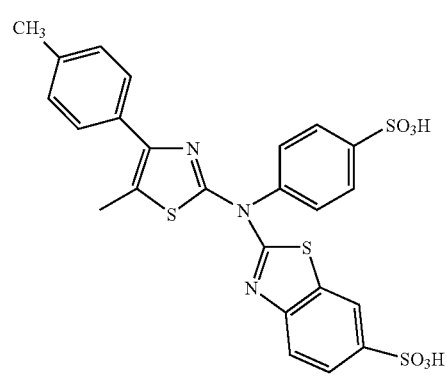 |
| 33 | 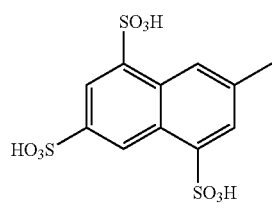 | 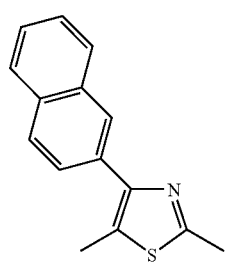 | 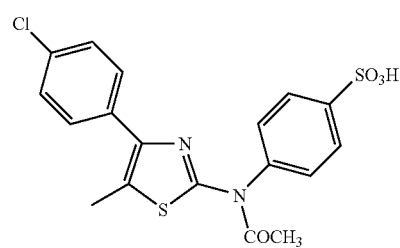 |
| 3-4 | 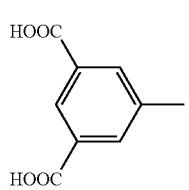 | 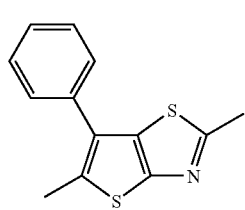 | 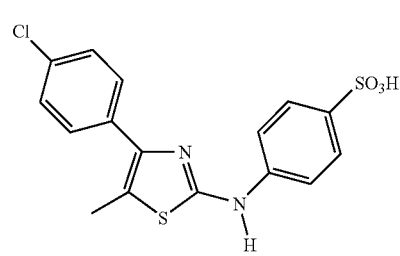 |

-continued
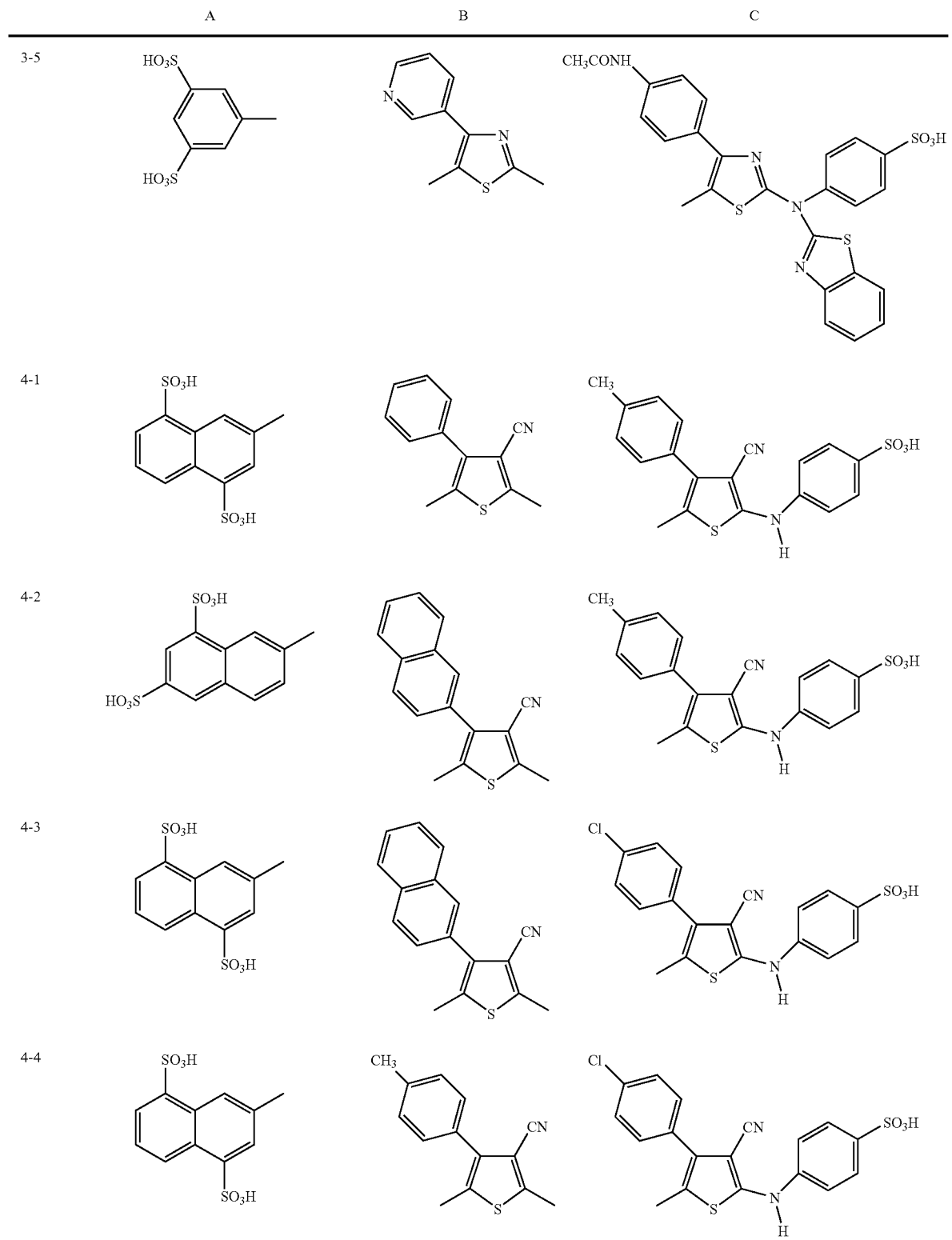

-continued
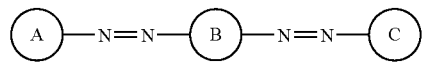
| | A | B | C |
|---|---|---|---|
| 4-5 | 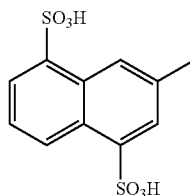 | 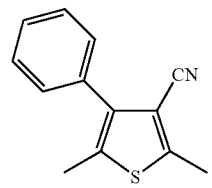 | 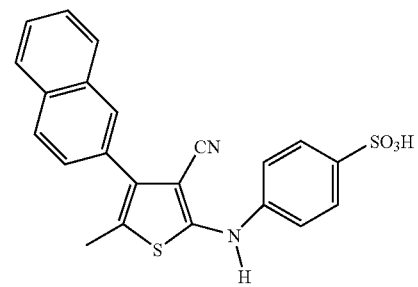 |
| 5-1 | 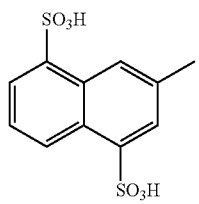 |  | 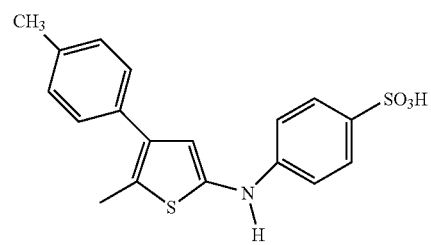 |
| 5-2 | 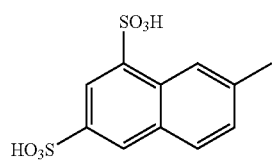 | 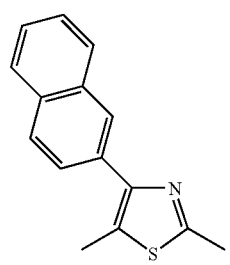 | 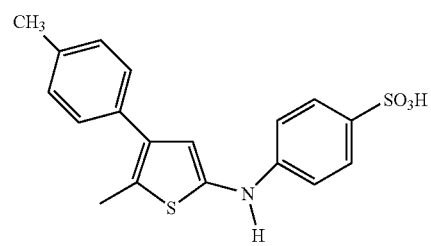 |
| 5-3 | 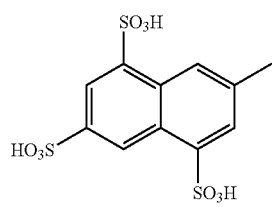 | 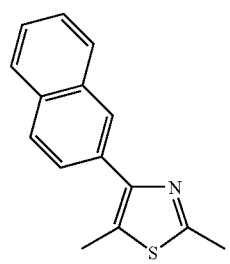 | 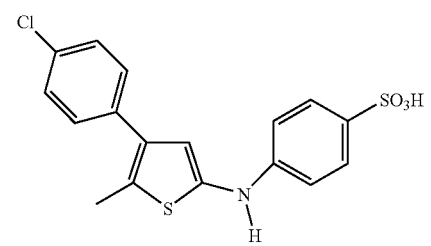 |
| 5-4 | 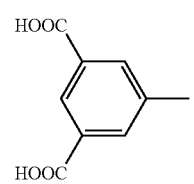 | 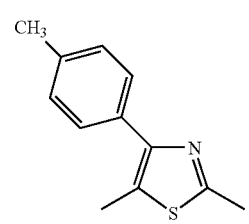 | 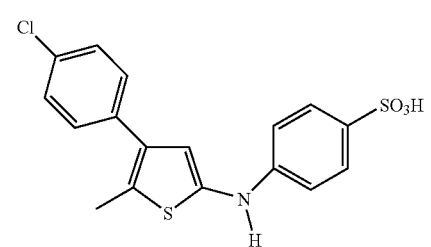 |

-continued
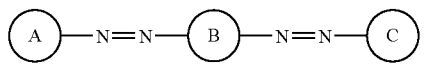
| | A | B | C |
|---|---|---|---|
| 5-5 | 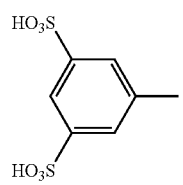 | 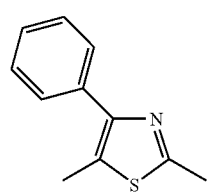 | 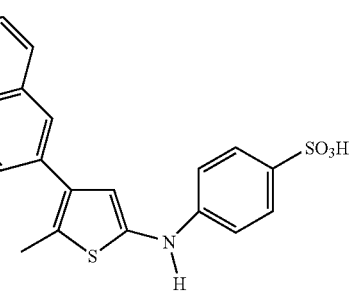 |
| 6-1 | 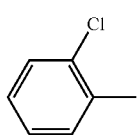 | 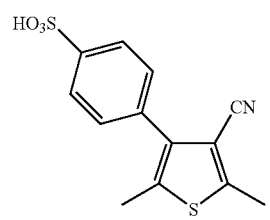 | 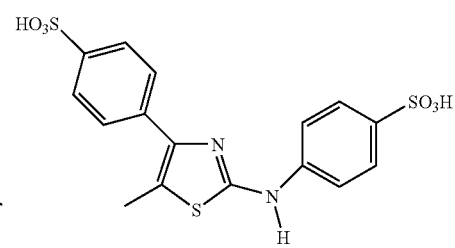 |
| 6-2 | 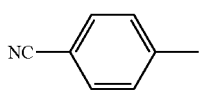 | 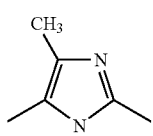 | 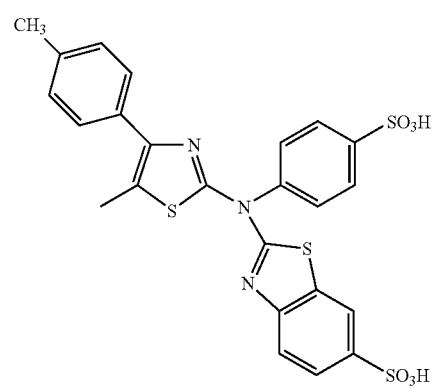 |
| 6-3 | 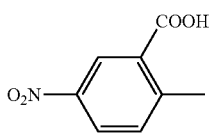 | 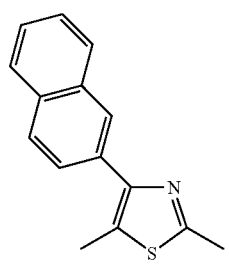 | 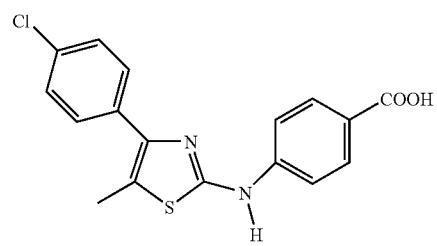 |
| 6-4 | 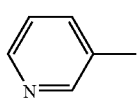 | 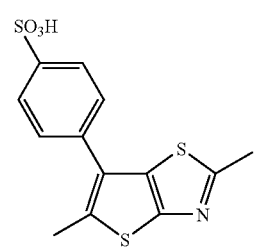 | 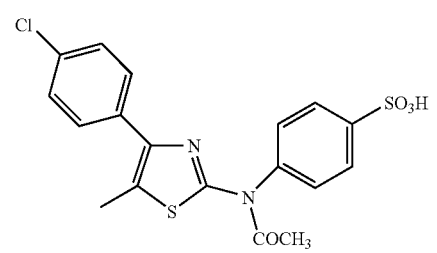 |

-continued
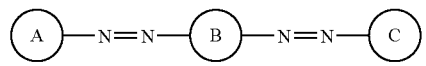
| | A | B | C |
|---|---|---|---|
| 6-5 | 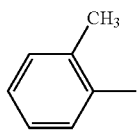 | 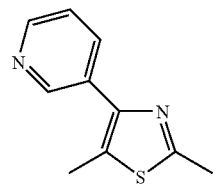 | 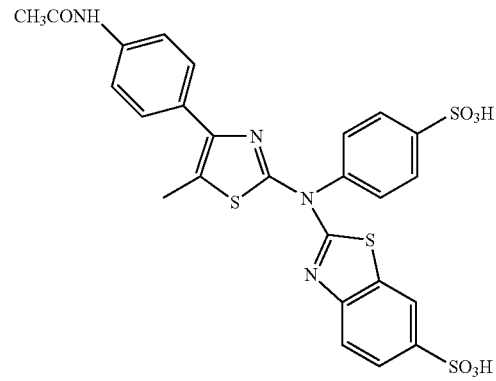 |
| 7-1 | 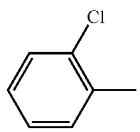 | 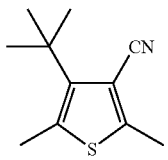 | 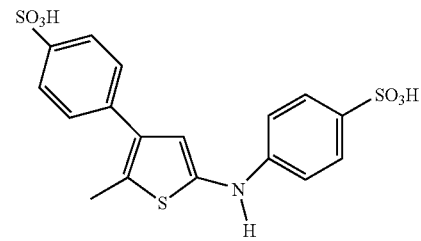 |
| 7-2 | 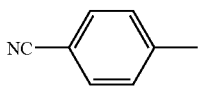 | 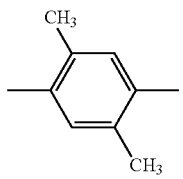 | 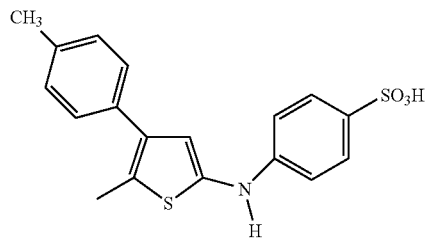 |
| 7-3 | 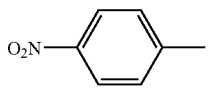 | 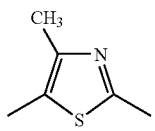 | 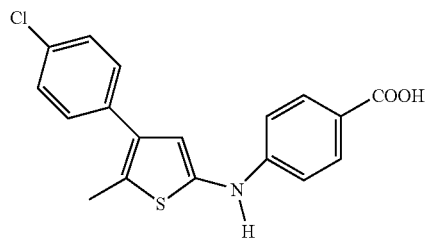 |
| 7-4 | 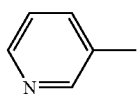 | 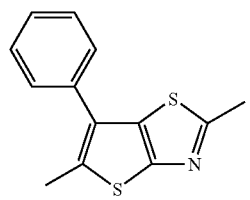 | 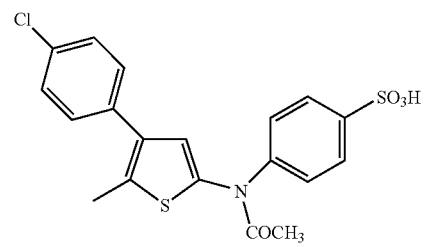 |

-continued

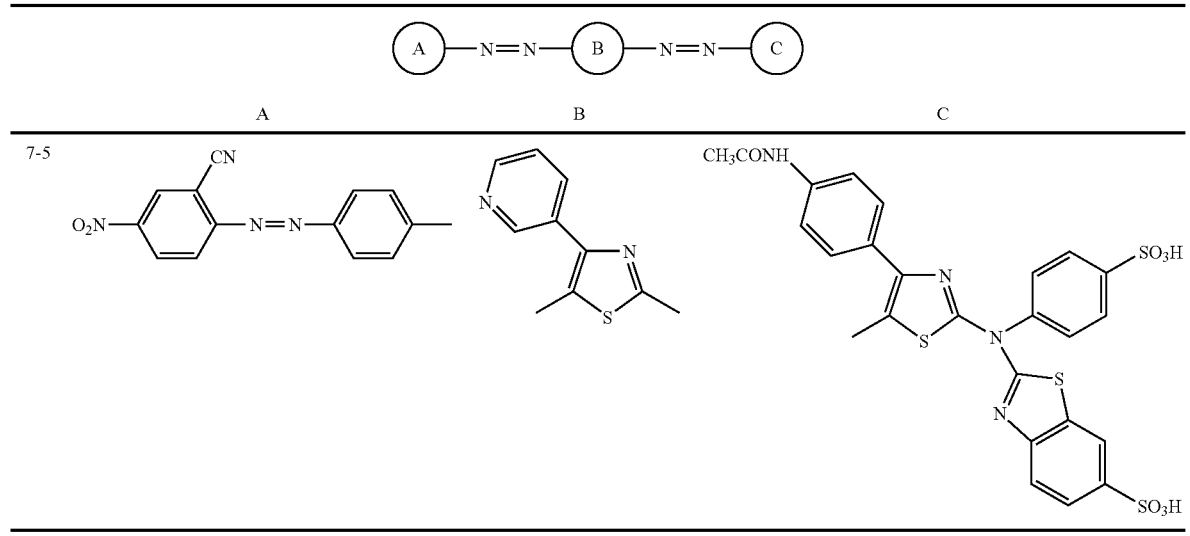

A synthesis example of the azo dye represented by formula (1) is described below.

Phosphoric acid (60 ml), 30 ml of acetic acid and 2.19 ml of nitrosylsulfuric acid (40% sulfuric acid solution) were stirred at 0° C. and thereto, a solution obtained by dissolving 5.26 g (10 mmol) of Monoazo Dye (1) in 13 ml of DMF was gradually added dropwise and stirred at 0° C. for 1 hour to produce a diazonium salt. In 182 ml of methanol where 3.51 g (10 mmol) of Coupler (2) was suspended and stirred at 25° C., the diazonium salt obtained above was added dropwise at an inner temperature of 25° C., thereby causing a coupling reaction. After the completion of dropwise addition, stirring was performed for 1 hour, the inner temperature was elevated to 50° C., 800 ml of isopropyl alcohol was added dropwise, and 5 g of lithium chloride was further added. Then, the precipitated dye was filtered. The coarse crystal of the dye obtained by filtration was subjected to desalting and purification by using a Cephadex LH-20 carrier produced by Pharmacia Inc. and an eluent of methanol/water=1/1 (v/v), as a result, 4 g of high-purity Dye (1-1) was obtained. Yield: 45%, FAB-WEIGHT (Neg.)=887.

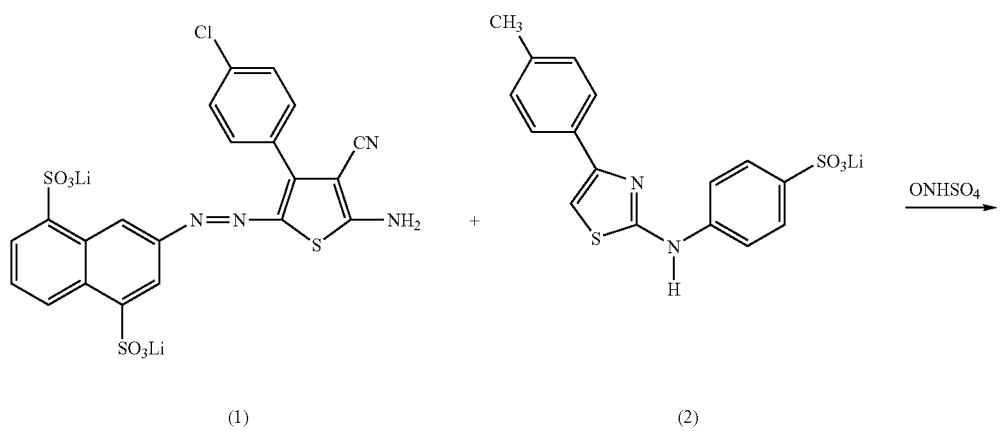

-continued

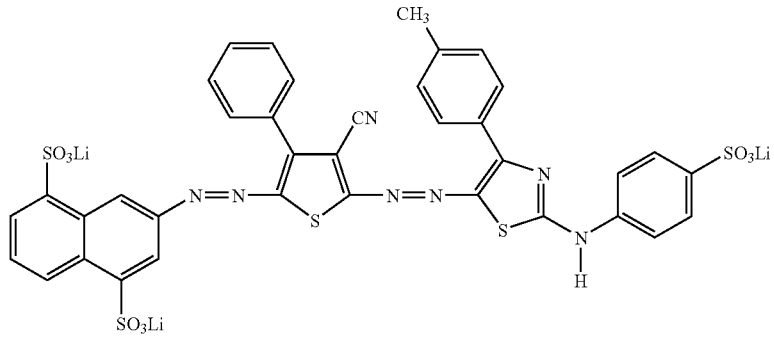

Dye (1-1)

The dye of the present invention is used after adjusting its physical properties such as solubility, dispersibility and thermal transferability by substituents to those suitable for use. The dye of the present invention can be used in a dissolved state, in an emulsion-dispersed state or even in a solid dispersion state according to the system where the dye is used.

(Ink and Inkjet Recording Ink)

The ink and inkjet recording ink of the present invention can be produced by dissolving and/or dispersing the azo dye of the present invention in a lipophilic or aqueous medium. An aqueous medium is preferred. If desired, other additives are added within the range of not impairing the effect of the present invention. Examples of other additives include known additives such as drying inhibitor (wetting agent), discoloration inhibitor, emulsification stabilizer, permeation accelerator, ultraviolet absorbent, antiseptic, fungicide, pH adjusting agent, surface tension adjusting agent, defoaming agent, viscosity adjusting agent, dispersant, dispersion stabilizer, rust inhibitor and chelating agent (described in JP-A-2003-306623). These various additives are directly added to the ink solution in the case of a water-soluble ink. When an oil-soluble dye is used in the form of a dispersion, the additives are generally added to the dispersion after the preparation of a dye dispersion but may be added to the oil or aqueous phase at the preparation.

In the inkjet recording ink of the present invention, other dyes and/or pigments (described, for example, in JP-A-2003-306623) may be used in combination with the above-described azo dye so as to adjust the color tone for obtaining a full color image.

The present invention is not limited in the inkjet recording system and is used for a known system, for example, an electric charge controlling system of jetting out the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the generated pressure.

The inkjet recording system includes a system of ejecting a large number of small-volume ink droplets of a so-called photo ink having a low concentration, a system of improving the pictorial quality by using a plurality of inks having substantially the same color hue but differing in the concentration, and a system using a colorless transparent ink. The volume of the ink hit is controlled mainly by a printer head.

For example, in the case of a thermal inkjet system, the volume of the ink hit can be controlled by the structure of the printer head. That is, the ink can be hit in a desired size by changing the ink chamber, heating section or nozzle size. Also, even in the thermal inkjet system, the ink can be hit in a plurality of sizes by providing a plurality of printer heads differing in the heating section or nozzle size.

In the case of a drop-on-demand system using a piezoelectric element, the volume of the ink hit can be changed by the structure of the printer head similarly to the thermal inkjet system, but as described later, the ink can be hit in a plurality of sizes with printer heads having the same structure by controlling the waveform of driving signals for driving the piezoelectric element.

An image-receiving material for an inkjet recording method of the present invention is not limited. An image-receiving material preferably comprises a support and an image-receiving layer containing an inorganic white pigment particle.

(Color Toner)

As for the binder resin for color toners where the dye of the present invention is introduced, the binders commonly used for toner all can be used. Examples thereof include a styrene-based resin, an acryl-based resin, a styrene/acryl-based resin and a polyester resin.

For the purpose of imparting flowability enhancement, electric charge control or the like to the toner, an inorganic fine powder or an organic fine particle may be externally added. A silica or titania fine particle of which surface is treated with an alkyl group-containing coupling agent is preferably used. The number average primary particle size thereof is preferably from 10 to 500 nm, and such a fine particle is preferably added in an amount of 0.1 to 20 weight % based on the toner.

As for the releasing agent, the releasing agents conventionally used for toner all can be used. Specific examples thereof include olefins such as low molecular weight polypropylene, low molecular weight polyethylene and ethylene-propylene copolymer, microcrystalline wax, carnauba wax, sazole wax and paraffin wax. The amount of the releasing agent added is preferably from 1 to 5 weight % based on the toner.

The electric charge controlling agent may be added, if desired, but a colorless controlling agent is preferred in view of coloration. Examples thereof include those having a quaternary ammonium salt structure or a calix arene structure.

The carrier may be either a non-coated carrier composed only of a magnetic material particle such as iron and ferrite, or a resin-coated carrier prepared by coating the surface of a magnetic material particle with resin or the like. The average particle size of the carrier is preferably from 30 to 150 µm in terms of the volume average particle size.

The image forming method to which the toner of the present invention is applied is not particularly limited, but examples thereof include a method of repeatedly forming a color image on a photoreceptor and then transferring it to form an image, and a method of sequentially transferring an image formed on a photoreceptor to an intermediate transferee or the like to form a color image on the intermediate transferee or the like, and then transferring it on an image-forming member such as paper to form a color image.

(Heat-Sensitive Transfer Material)

The heat-sensitive recording material of the present invention comprises a support having thereon an ink sheet provided by coating the dye of the present invention together with a binder, and an image-receiving sheet for fixing the dye migrated correspondingly to the heat energy applied from the thermal head according to an image recording signal. The ink sheet can be formed by dissolving the dye and a binder in a solvent or dispersing the dye in a fine particle state in a solvent to prepare an ink solution, coating the ink on a support and appropriately drying it.

As for the binder resin, ink solvent, support and image-receiving sheet which can be used, those described, for example, in JP-A-7-137466 can be preferably used.

For applying this heat-sensitive recording material to a heat-sensitive recording material capable of full color image recording, at least a black ink sheet comprising a black image-forming substance containing the dye of the present invention, a cyan ink sheet containing a heat-diffusible cyan dye capable of forming a cyan image, a magenta ink sheet containing a heat-diffusible magenta dye capable of forming a magenta image, and a yellow ink sheet containing a heat-diffusible yellow dye capable of forming an yellow image are preferably formed on a support by coating these in sequence.

(Color Filter)

The method for forming a color filter includes a method of forming a pattern by using a photoresist and then dyeing it, and as disclosed, for example, in JP-A-4-163552, JP-A-4-128703 and JP-A-4-175753, a method of forming a pattern by using a photoresist having added thereto a coloring agent. In the case of introducing the dye of the present invention into a color filter, either one of these methods may be used, but the color filter is preferably formed by the method described in JP-A-4-175753 or JP-A-6-35182 where a positive resist composition comprising a thermosetting resin, a quinonediazide compound, a cross-linking agent, a coloring agent and a solvent is coated on a substrate and exposed through a mask, the exposed area is developed to form a positive resist pattern, the entire surface of the positive resist pattern is exposed, and then the exposed positive resist pattern is cured. Also, a color filter in the system of RGB primary colors or YMC complementary colors can be obtained by forming a black matrix in a usual manner.

As for the thermosetting resin, quinonediazide compound, crosslinking agent and solvent used here and the amounts thereof, those described in the above-described patent publications can be preferably used.

EXAMPLES

The present invention is described in greater detail below by referring to Examples, but the present invention is not limited to these Examples.

Example 1

Ultrapure water (resistivity: 18 MΩ or more) and a base were added to the following components to make 1 liter and the resulting solution was stirred for 1 hour under heating at 30 to 40° C. and then filtered under reduced pressure through a microfilter having an average pore size of 0.25 µm to prepare Black Ink Solution Bk-101.

| (Formulation of Black Ink Bk-101) | |
| --- | --- |
| (Solid Contents) | |
| Black Dye (1-1) of the present invention | 60 g/liter |
| Proxel | 5 g/liter |
| Urea | 20 g/liter |
| Benzotriazole | 3 g/liter |
| (Liquid Components) | |
| Diethylene glycol monobutyl ether (DGB) | 100 g/liter |
| Glycerin (GR) | 125 g/liter |
| Diethylene glycol (DEG) | 100 g/liter |
| 2-Pyrrolidone (PRD) | 30 g/liter |
| Triethanolamine (TEA) | 5 g/liter |
| Surfynol STG (SW) | 10 g/liter |

Also, Black Inks Bk-102 to 110 having the same composition as Bk-101 except for changing the dye and base in the ink formulation to those shown in Table 1.

These inks each was filled in a black ink cartridge of an inkjet printer PM-980C manufactured by Seiko Epson Corporation, and a gray image pattern stepwise changed in the density was printed. The image-receiving sheet on which the image was printed was an inkjet paper sheet "kassai" in super photo grade produced by Fuji Photo Film Co., Ltd. The image quality, ejection stability of ink, and fastness of image were evaluated.

TABLE 1

| | Dye | Base | pH of Ink |
| --- | --- | --- | --- |
| Bk-101 | 1-1 | TEA 5 g/liter | 8.1 |
| Bk-102 | 1-3 | TEA 5 g/liter | 8.1 |
| Bk-103 | 4-3 | TEA 5 g/liter | 8.1 |
| Bk-104 | Comparative Dye 1 | TEA 5 g/liter | 8.1 |
| Bk-105 | Comparative Dye 2 | TEA 5 g/liter | 8.1 |
| Bk-106 | Comparative Dye 3 | TEA 5 g/liter | 8.1 |
| Bk-107 | 2-2 | LiOH 2 g/liter | 8.2 |
| Bk-108 | Comparative Dye 3 | LiOH 2 g/liter | 8.2 |
| Bk-109 | 4-4 | NaOH 2 g/liter | 8.2 |
| Bk-110 | Comparative Dye 3 | NaOH 2 g/liter | 8.2 |

(Evaluation Test)

1) As for the color hue, a color hue corresponding to a broad absorption band of the black dye in the vicinity of 590 nm where a longer wavelength dye in black dyes has a λmax was evaluated on a three-stage scale of excellent, good and poor. The evaluation results are shown in Table 1. In the Table below, A indicates that the color hue was excellent, B indicates that the color hue was good, and C indicates that the color hue was poor.

2) As for the image preservability of the black coloring matter, the following evaluations were performed by using a gray printed sample. The image preservability was evaluated by measuring the density of the gray stepwise pattern (pattern S) by an X-Rite 310 densitometer equipped with a Status A filter, and measuring the change in the density at the base point assigned to a point in the vicinity of Dvis=1.0.

(1) In the evaluation of fastness to light, the density ($D_{vis}$) Ci of the pattern S immediately after printing was measured and after the image was irradiated with xenon light (85,000 lx) for 14 days by using a weather meter manufactured by Atlas, the density Cf of the pattern S was again measured. Then, the dye residual ratio Cf/Ci*100 was determined and evaluated.

The sample was rated A when the dye residual ratio was 80% or more, rated B when from 70 to 80%, or rated C when less than 70%.

(2) In the evaluation of fastness to heat, the density of the pattern S was measured by X-Rite 310 before and after the sample was stored for 21 days under the conditions of 80° C. and 70% RH, and the dye residual ratio was determined and evaluated.

The sample was rated A when the dye residual ratio was 90% or more, rated B when 80 to 90%, or rated C when less than 80%.

(3) In the evaluation of ozone resistance (fastness to $O_3$), the sample was left standing for 96 hours in a box set to an ozone gas concentration of 0.5 ppm, the density of the pattern S before and after standing in the ozone gas atmosphere was measured by X-Rite 310, and the dye residual ratio was determined and evaluated.

The ozone gas concentration in the box was set by using an ozone gas monitor (Model OZG-EM-01) manufactured by APPLICS.

The sample was rated A when the dye residual ratio was 80% or more, rated B when from 70 to 80%, or rated C when less than 70%.

The results obtained are shown in Table 2.

TABLE 2

| | Color Hue | Fastness to Light | Fastness to Heat | Fastness to $O_3$ |
|---|---|---|---|---|
| Bk-101 (Invention) | A | A | A | A |
| Bk-102 (Invention) | A | A | A | A |
| Bk-103 (Invention) | A | A | A | A |
| Bk-104 (Comparative Example) | B | C | B | C |
| Bk-105 (Comparative Example) | B | C | B | C |
| Bk-106 (Comparative Example) | B | C | B | C |
| Bk-107 (Invention) | A | A | A | A |
| Bk-108 (Comparative Example) | B | C | B | C |
| Bk-109 (Invention) | A | A | A | A |
| Bk-110 (Comparative Example) | B | C | B | C |

As seen from the results in Table 2, the ink solution produced according to the formulation satisfying the conditions of the present invention surpasses Comparative Examples in all performances.

Comparative Dye 1:

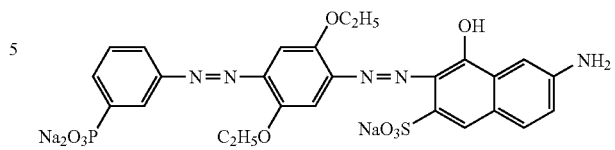

Comparative Dye 2:

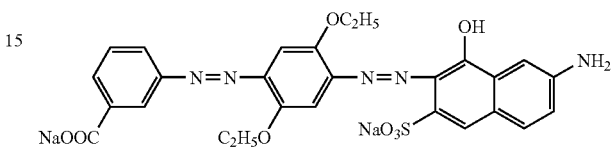

Comparative Dye 3:

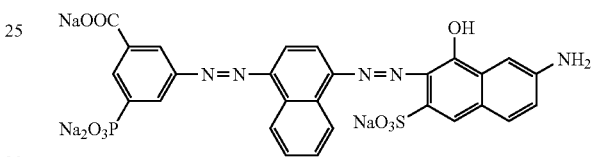

As seen in Table 2, the image (color hue) obtained from the ink solution of the present invention (Bk-101, Bk-102, Bk-103, Bk-107, Bk-109) was superior to the image obtained from the comparative ink solution. Also, the image obtained by using the ink solution of the present invention was excellent in the fastness to light and in the ozone gas resistance.

Furthermore, by using the ink solution (Bk-101, Bk-102, Bk-103, Bk-107, Bk-109), an image was printed on Super-Fine Special Gloss Paper (MJA4S3P, produced by Seiko Epson Corporation) in an inkjet printer (PM-700C, manufactured by Seiko Epson Corporation). When the image printed was evaluated on the color hue and fastness to light, the same results as in Table 2 were obtained in both evolutions.

Example 2

The same inks produced in Example 1 each was filled in a cartridge of an inkjet printer BJ-F850 (manufactured by Canon Inc.) and in this inkjet printer, an image was printed on a photo gloss paper sheet GP3-1 produced by the same company and evaluated in the same manner as in Example 1. Then, the same results as in Example 1 were obtained.

The present application claims foreign priority based on Japanese Patent Application No. JP-2003-434594 filed Dec. 26, 2003, the contents of which is incorporated herein by reference.

What is claimed is:
1. An aqueous ink comprising a polyazo dye, wherein the polyazo dye comprises:
  at least two azo groups;
  an ionic hydrophilic group; and
  a sulfur-containing 5-membered heterocyclic group, and wherein the polyazo dye is represented by formula (1):

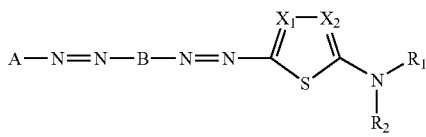

wherein

A and B each independently represents an aromatic group which may be substituted, or a heterocyclic group which may be substituted;

$X_1$ and $X_2$ each independently represents a nitrogen atom, $=CR_3-$ or $-CR_4=$;

$R_1$ and $R_2$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent; and $R_3$ and $R_4$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an alkylamino group, an arylamino group, a heterocyclic amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted.

2. The aqueous ink according to claim 1, wherein B represents the heterocyclic group comprising the sulfur-containing 5-membered heterocyclic group.

3. The aqueous ink according to claim 1, which is for inkjet recording.

4. An inkjet recording method comprising forming an image on an image-receiving material by using an aqueous ink according to claim 1, the image-receiving material comprising: a support; and an image-receiving layer comprising an inorganic white pigment particle.

* * * * *